United States Patent Office 3,706,009
Patented Dec. 12, 1972

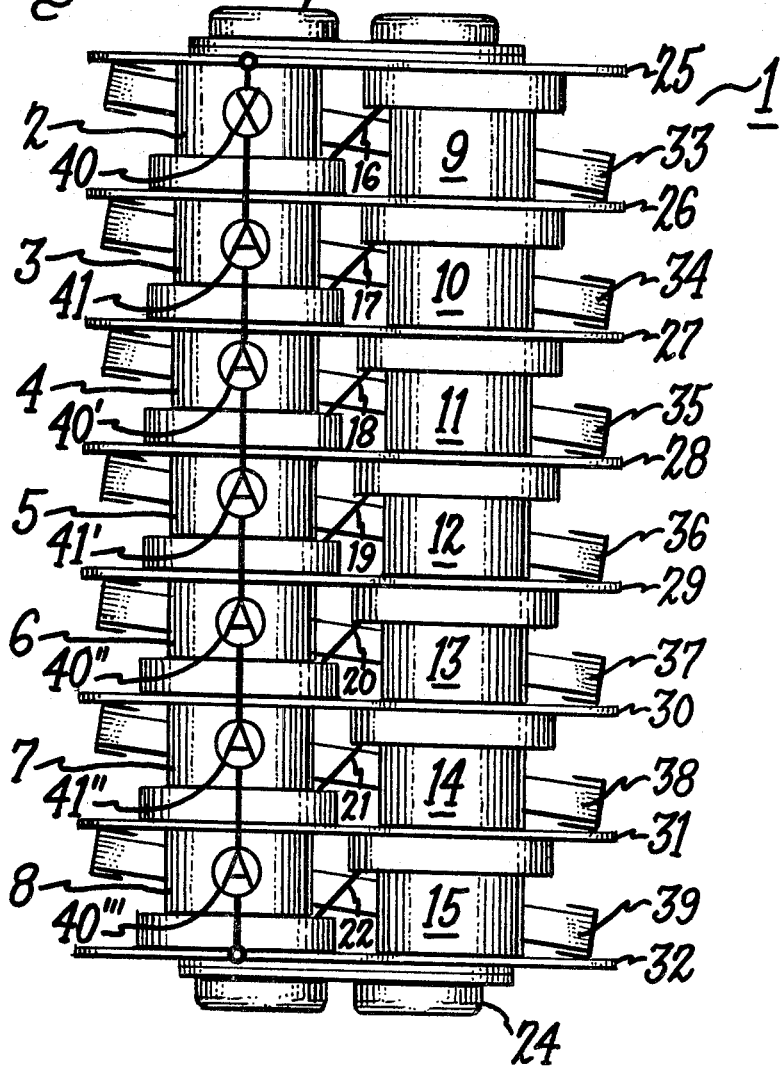

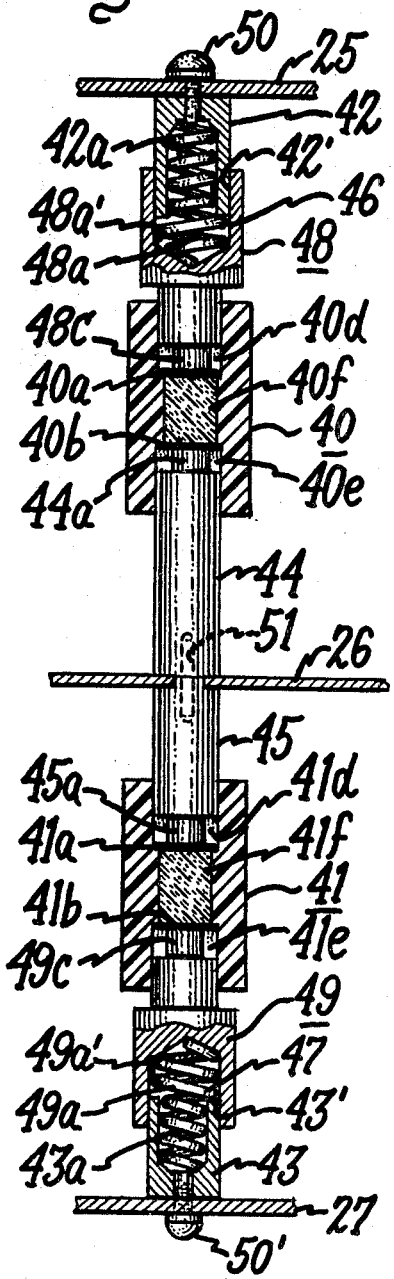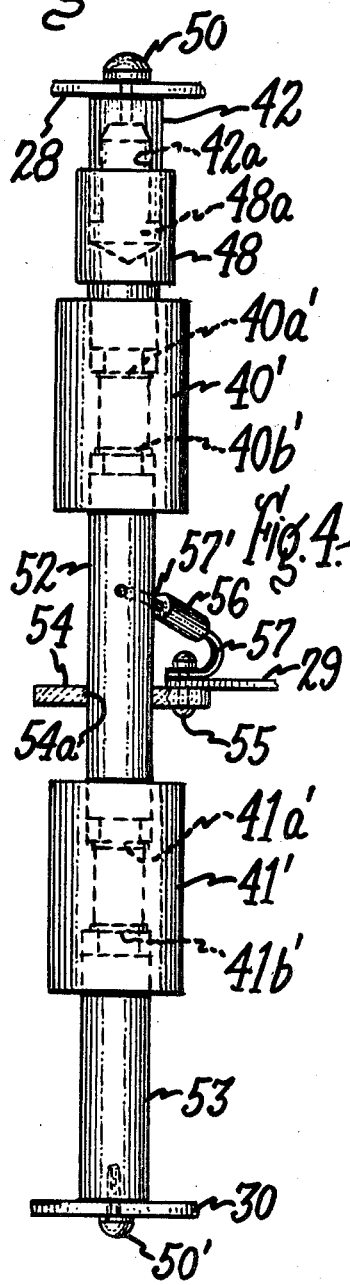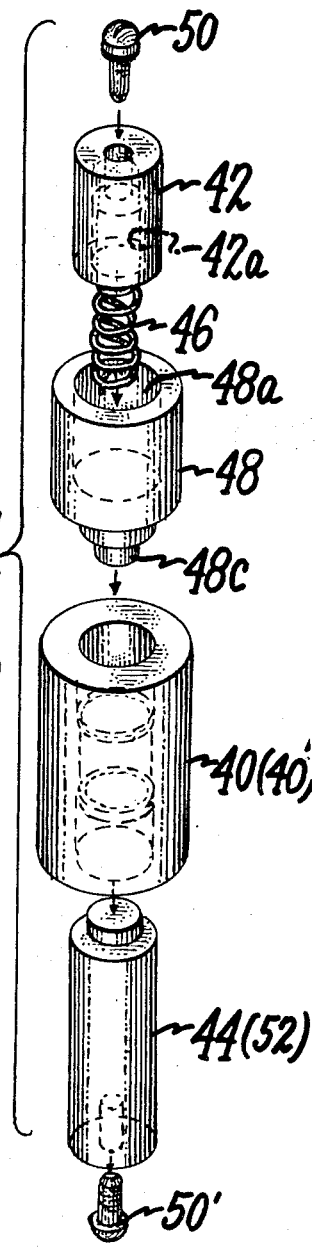

3,706,009
LIGHTNING ARRESTER CAPACITIVE GRADING CIRCUIT MOUNTING MEANS
Roderick Reitz, Lanesboro, Mass., assignor to General Electric Company
Filed Dec. 22, 1971, Ser. No. 210,769
Int. Cl. H02h 9/06
U.S. Cl. 317—68                                8 Claims

ABSTRACT OF THE DISCLOSURE

A surge voltage arrester, such as a lightning arrester, is provided with a spring-loaded mounting means for releasably supporting a plurality of capacitors in a series circuit arrangement in which they act as a voltage grading circuit for the sparkgap assemblies of the arrester. The mounting means includes a plurality of slidably engageable terminal and contact members that are shaped to cooperate with recessed terminals in the grading capacitors to form a relatively rigid mounting column that is effective to support the capacitors in a predetermined position adjacent the sparkgap assemblies of the arrester. The mounting means are further operable to permit removal of one or more of the capacitors from the series-connected column without requiring disassembly of the entire column.

BACKGROUND OF THE INVENTION

The use of capacitive grading circuits to distribute voltage across the sparkgap assemblies of a surge voltage arrester is well known in the prior art. However, before the present invention the various prior art mounting means for supporting the capacitors of such circuits in operating relationship were relatively expensive to manufacture and sometimes resulted in mechanically unstable arrangements. A particular problem encountered with prior art grading capacitor mounting arrangements was that vibration of the arrangements during shipping and handling prior to installation of the arrester sometimes resulted in capacitors being dislodged from the grading circuit. Another problem inherent in many prior art capacitive grading circuit mounting arrangements was that a major portion of the mounting structure had to be disassembled in order to replace one or more capacitors. Consequently, it was a relatively difficult and expensive operation to accurately match the various capacitors to form a suitable grading circuit, because if a given capacitor had to be replaced once the circuit was assembled, the required disassembly of the mounting arrangement was time consuming.

A primary object of the present invention is to provide a grading circuit capacitor mounting arrangement that overcomes the above-identified problems or prior art mounting arrangements.

Another object of the invention is to provide a grading circuit capacitor mounting means that makes it possible to change capacitors without disassembling the entire mounting arrangement.

A further object of the invention is to provide a grading circuit capacitor mounting means that rigidly supports a plurality of capacitors in an electrical series-connected arrangement that cannot be dislodged by normal handling and shipping vibration of the assembly.

Additional objects and advantages of the invention will be apparent to those skilled in the art from the description of it that follows taken in connection with the accompanying drawings.

SUMMARY OF THE INVENTION

In one preferred embodiment of the invention a plurality of generally similarly shaped grading circuit capacitors are supported in a series connected arrangement by a plurality of cylindrically shaped terminal members and cooperating movable contact members that are effective to transmit a biasing force from a coil spring to resiliently hold the capacitors in operating position. Each capacitor may be manually moved against the biasing force of an associated coil spring thereby to cause a contact member to slide relative to one of the terminal members and free the capacitor to be pivotally removed from its operating position between the contact member and the terminal members, so that a new capacitor may be substituted for it. In an alternative embodiment of the invention, a grading circuit resistor is electrically connected between one of the terminal members, that is otherwise electrically isolated from the arrester discharge path by a dielectric supporting member, to a mid-point of the main discharge path of the arrester.

BRIEF DESCRIPTION OF THE DRAWINGS

FIG. 1 is a schematic side elevation view of a surge voltage arrester sparkgap assembly showing the relative orientation of a capacitive grading circuit mounting column arranged with respect to the assembly pursuant to the present invention.

FIG. 2 is an exploded, side elevation view, partly in cross section, showing a portion of a capacitive grading circuit mounting means constructed pursuant to the present invention.

FIG. 3 is an exploded, side elevation view, of a second portion of a capacitive grading circuit mounting arrangement constructed pursuant to an alternative embodiment of the present invention.

FIG. 4 is an exploded, perspective view of one of the capacitors illustrated in FIG. 2 shown in combination with the terminal members and contact member directly associated therewith, pursuant to the present invention.

DESCRIPTION OF THE PREFERRED EMBODIMENTS

Referring now to FIG. 1 of the drawing, it will be seen that there is shown a surge voltage arrester sparkgap assembly 1, illustrated in schematic form. The sparkgap assembly 1 includes a plurality of sparkgap housing assemblies 2, 3, 4, 5, 6, 7 and 8, each of which may be fabricated in any well known manner. For example, each of the sparkgap assembly housings 2–8 may be constructed in the same manner as the sparkgap assemblies 11 shown in U.S Pat. 3,518,483, which issued June 30, 1970 and is assigned to the assignee of the present invention. Mounted in a column parallel to the sparkgap assemblies 2–8 are a plurality of non-linear resistance valve blocks 9, 10, 11, 12, 13, 14 and 15. As shown, the bottom of each sparkgap assembly housing, such as housing 2, is electrically connected by a suitable conductive metal strap, such as strap 16, to the top of a non-linear resistance valve, such as valve 9, mounted parallel thereto. These connecting straps are identified by the numbers 16, 17, 18, 19, 20, 21 and 22. To complete a series-circuit surge voltage discharge path between end terminals 23 and 24, a plurality of electrically conductive metal plate members 25, 26, 27, 28, 29, 30, 31 and 32 are mounted at the two ends of the self-supporting stacks of sparkgap assemblies 2–8 and non-linear valve blocks 9–15. A discharge path is thus formed in a manner that is described in detail in the aforementioned U.S. Pat. 3,518,483, to which reference may be made if a more complete description of this relatively conventional feature of the arrester assembly shown herein is desired.

In order to distribute a voltage impressed across the end terminals 23 and 24 in a desired manner across each of the sparkgap assemblies 2–8 and the non-linear valves 9–15, a plurality of elongated ohmic resistors 33, 34, 35, 36, 37, 38 and 39 are electrically connected, respectively, between adjacent plate members 25–32, as shown in FIG. 1. Also, a plurality of capacitor elements 40, 41, 40', 41', 40'', 41'' and 40''' are designated schematically in FIG. 1. These elements and their associated mounting means are the essence of the present invention, therefore they will be described in more detail hereinafter. For now, it need only be understood that the capacitor element mounting means is effective to hold and electrically connect each of the capacitor element 40–40''' in series with one another and in shunt circuit relationship across one of the sparkgap assemblies 2–8, respectively, thereby to afford a capacitive voltage grading circuit that is operable to distribute voltage across each of the sparkgap assemblies 2–8.

Referring now to FIG. 2 of the drawing, it will be seen that there is illustrated an exploded view of the capacitor elements 40 and 41, in combination with a mounting means that will now be described in greater detail. It should be understood that although only two of the capacitor elements, 40 and 41, are shown, the mounting means illustrated in FIG. 2 may also be used to mount the remainder of the capacitor elements 40'–40''', if desired. Also, as will be described later with reference to FIG. 3, alternative embodiments of the mounting means disclosed with reference to FIG. 2 may be used to mount one or more of these other capacitor elements.

Pursuant to the present invention, the mounting means shown in FIG. 2 comprises the plurality of electrically conductive plate members 25, 26 and 27. As pointed out above with reference to FIG. 1, each of the plate members 25–27 is mounted respectively adjacent an end of one of the sparkgap assemblies 40 and 41, and is electrically connected with a main electrode (not shown) in one of the respective sparkgap assemblies. Specifically, the plate member 25 is electrically connected to a main electrode mounted near the top of sparkgap assembly 2, plate member 26 is electrically connected to a main electrode near the bottom of sparkgap assembly 2 and plate member 27 is electrically connected to a main electrode at the bottom of sparkgap assembly 3. The mounting means further comprises a plurality of elongated first terminal members 42 and 43 each of which are formed of electrically conductive metal, such as aluminum, and are shaped to have at least one outer wall surface, such as the surfaces 42' and 43', respectively, that is generally parallel to the longitudinal axis of the terminal members 42 and 43 when they are mounted in operating position. In the form of the invention illustrated in FIG. 2, the wall surfaces 42' and 43' are in the form of cylinders.

A plurality of elongated second terminal members 44 and 45 that are also formed of an electrically conductive metal are also used to form the mounting means of the invention. As is clearly shown in FIG. 2, each of the first terminal members 42 and 43 include means defining spring-receiving recesses 42a and 43a in one end of each of these first terminal members. A pair of electrically conductive coil springs 46 and 47 are mounted, respectively, in the recesses 42a and 43a. Finally, the mounting means of the invention includes a plurality of elongated contact members 48 and 49 each of which have means defining terminal-receiving recesses 48a and 49a in one end thereof. As is apparent from the illustration in FIG. 2, each of the terminal-receiving recesses 48a and 49a are formed to receive one end of the coil springs 46 and 47 and also to have at least one wall surface 48a' and 49a' that is generally parallel to the longitudinal axis of the respective terminal members 42 and 43, when the terminal members are mounted in their assembled position, as shown. In the preferred form of the invention being described, the wall surfaces 48a' and 49a' are cylindrical in form and have a diameter sufficiently large to slidably accommodate the outer wall surfaces 42' and 43' of first terminal member 42 and 43, respectively, therein.

Each of said first terminal members 42 and 43 and the second terminal members 44 and 45 is mounted in fixed relationship, respectively, on the separate plate members 25–27, as shown in FIG. 2, by terminal member mounting means 50, 50' and 51. These terminal member mounting means may take any suitable form; however, in this embodiment of the invention the terminal member mounting means 50 and 50' comprise metal screws that are forced through small diameter pre-formed apertures in plate members 25 and 27 and in first terminal members 42 and 43, thereby to securely fasten the first terminal members 42 and 43 in relatively fixed relationship to the plate members 24 and 27. The terminal member mounting means 51 comprises a somewhat similar stake member that is forced through a preformed aperture in plate member 26 and then is driven into preformed apertures in the second terminal members 44 and 45 to hold them in rigid, fixed relationship with respect to the plate member 26.

As shown, each of the first terminal members 42 and 43 and second terminal members 44 and 45 are mounted with their respective longitudinal axes in substantial alignment with one another. Also, each of the contact members 48 and 49 are positioned between a pair of first and second terminal members, as shown, with their respective longitudinal axes held in substantial alignment with the axes of the terminal members due to the sliding engagement that exists between the aforementioned outer wall surfaces 42' and 43' and the juxtaposed wall surfaces 48a' and 49a' of the contact members.

It will be noted that each of the capacitor elements 40 and 41 comprises a capacitor having a pair of recessed electrodes 40a, 40b and 41a, 41b, respectively, on opposite sides thereof. The electrodes 40a, 40b and 41a, 41b may be any suitable conventional form, but in this embodiment they comprise, respectively, layers of silver paint that are fired onto opposite ends of ceramic plugs 40f and 41f, which, in turn are encapsulated in an insulating epoxy material that comprises the outer portions of the bodies of the capacitors 40 and 41, as shown. Any suitable conventional insulating epoxy may be used for this purpose. Each capacitor 40 and 41 also includes means defining a pair of substantially equal size cylindrically shaped recesses 40d, 40e and 41d, 41e, respectively, positioned in opposite sides thereof so that one of the recessed electrodes is disposed at the bottom of each of these cylindrically shaped recesses, as shown in FIG. 2. Each of the capacitors 40 and 41 is positioned, respectively, between one of the contact members 48 and 49 and one of the second terminal members 44 and 45. Thus, due to the compressive force exerted by coil springs 46 and 47, these springs are operable to bias the contact members 48 and 49 into engagement with one of the electrodes 40a and 41a, respectively, on the capacitors 40 and 41. At the same time, the force exerted by springs 46 and 47 is operable to bias the other electrodes 40b and 41b into engagement, respectively with the second terminal members 44 and 45, thereby to form an electrical circuit between the end plate members 25 and 27. In the form of the invention shown in FIG. 2, each of the second terminal members 44 and 45 includes means defining a cylindrically shaped contact portion 44a and 45a on the respective ends thereof. It will be noted that the outer ends of contact portions 44a and 45a is smaller in diameter than the diameter of terminal members 44 and 45. This feature assures corona-free contact between the contact portions and the electrodes 40b and 41a associated with them. The inner parts of contact portions 44a and 45a, which are integral with terminal members 44 and 45, are adapted to fit into the respective recesses 40e and 41d of the capacitors 40 and 41, in sliding engagement therewith. In this regard, contact portions 44a and 45a include the respective portions of terminal members 44 and 45 that extend outward from the planes defined by the ends of capacitor members 40 and 41 at their junctions with terminal members 44 and 45. In like manner, it will be noted that each of the contact members 48 and 49 includes means defining a cylindrically shaped contact portions 48c and 49c, on the respective ends thereof opposite the terminal-receiving recesses 48a and 49a therein. The respectve contact portions 48c and 49c are adapted to fit into the cylindrically shaped recesses 40d and 41e of capacitors 40 and 41.

In the operation of the embodiment of the invention described above, it has been found that the relatively large diameters of terminal members 42, 43, 44 and 45 help to stabilize the capacitor mounting means so that the vertical alignment of the column including grading capacitors 40 and 41 is easily maintained. In addition, it will be noted that each of the contact members 48 and 49 may be slid axially against the biasing force of springs 46 and 47 in order to move the contact portions 48c and 49c out of the recesses 40d and 41e, so that capacitors 40 and 41 may be removed from the capacitive grading circuit, if desired. Thus, it is a relatively simple matter to replace the capacitors, on an individual basis. It will also be apparent that if capacitor mounting means similar to those described in detail with reference to FIG. 2 above are used to support the remaining capacitors 40'–40''', shown in FIG. 1, the supporting means of the present invention is operable to electrically connect each of the capacitors in series between the two end terminals 23 and 24 of the sparkgap assembly 1, shown in FIG. 1.

Since it is frequently desirable in a capacitive grading circuit for a surge voltage arrester to provide means in addition to the reactance of the respective capacitors, for distributing the voltage being graded across the assemblies of the arrester, an alternative embodiment of the present invention has been developed to afford such a function. This alternative embodiment of the invention is depicted in FIG. 3 and it will now be described in detail. In order to simplify this description, reference numerals identical to those used with regard to the description of the embodiment of the invention shown in FIG. 2 will be used to identify parts that may be substantially identical to those shown in FIG. 2. Of course, it should be understood that the capacitance supporting means shown in FIG. 3 may be connected in series with the supporting means shown in FIG. 2, or in lieu of all, or a portion, thereof.

For purposes of the present description, the mounting means described with reference to FIG. 3 may be deemed to comprise first, second and third electrically conductive plate members 28, 29 and 30, which correspond to the like numbered plates in FIG. 1. Thus, it will be understood that the second plate member 29 is mounted between the pair of sparkgap assemblies 5 and 6 while the first plate member 28 and third plate member 30 are mounted respectively adjacent the ends of the sparkgap assemblies 5 and 6 opposed to the ends thereof abutting the second plate member 29. As described above with reference to FIG. 1, each of the plate members 28–30 are electrically connected to form a circuit between themselves and a main surge voltage discharge path through the sparkgap assembly 1. An elongated first terminal member 42, an elongated second terminal member 52 and an elongated third terminal member 53, each formed of electrically conductive metal and being generally cylindrical in shape, are positioned with respect to plates 28–30 as shown in FIG. 3. The first terminal member 42 includes means defining a spring-receiving recess 42a therein and electrically conductive coil spring (not shown in FIG. 3) similar to the coil spring 46 illustrated in FIG. 2, is mounted in the spring-receiving recess 42a. As is also shown in FIG. 2, an elongated generally cylindrically shaped contact member 48 having means defining a terminal-receiving recess 48a in one end thereof is provided to receive one end of the coil spring 46. Terminal member mounting means 50 and 50' in the form of metal stakes or rivets are used to mount the the first and third terminal members 42 and 53 in a manner described above with reference to FIG. 2 and the first terminal members 42 and 43 described therein. Of course, the first and third terminal members 42 and 53 are mounted with their longitudinal axis in substantial alignment.

In accordance with this embodiment of the invention, a terminal member supporting means 54 formed of a suitable dielectric material, such as Plexiglas, is mounted on the second plate member 29 by any suitable conventional means, such as by driving a metal rivet 55 therethrough. The terminal member supporting means 54 includes means defining a generally circular aperture 54a through it. The aperture 54a has a diameter large enough to slidably receive the second terminal member 52 therethrough. Thus, the supporting means 54 is effective to support the second terminal member 52 in a predetermined position with respect to the second plate member 29 while maintaining it in an electrically isolated relationship to the plate member 29.

It will be apparent that if no electrical connection is made between the second terminal member 52 and the plate member 29, a different voltage grading relationship will exist across the sparkgap assemblies 5 and 6 than would exist if such a connection is made. Moreover, by connecting an electrical resistance, such as resistance member 56 by its pair of electric conductors 57 and 57' mounted in the opposite ends thereof, a DC charge is prevented from accumulating on part 52 so possible resultant damage to capacitors 40' and 41' is avoided.

To complete the description of this second embodiment of the invention, it will be noted that the contact member 48 is positioned between the first and third terminal members 42 and 53 with its longitudinal axis held in substantial alignment with the axes of these terminal members by the sliding engagement between the walls of cylindrical terminal-receiving recess 48a and the cylindrically shaped outer wall of first terminal member 42. At the same time, the second terminal member 52 is supported with its longitudinal axis in alignment with the axes of the other terminal members 42 and 53, by the terminal member supporting means 54. Finally, the capacitor elements comprising capacitors 40' and 41' are mounted between the first and third terminal members 42 and 53. As discussed above with reference to FIG. 2, each of the capacitors 40' and 41' include a pair of electrodes 40a', 40b' and 41a', 41b', respectively. Each of these electrodes is biased, respectively, by the coil spring 46 into electrical engagement with the terminal members 42, 52 and 53 between which the capacitors 40' and 41' are mounted. Thus, it will be apparent that in operation of this embodiment of the invention an electrical series circuit is formed between the plate members 28 and 30, through the capacitors 40' and 41' when the mounting means is in the assembled position shown in FIG. 3. Also, the contact member 48 may be moved axially against the compressive force of spring 46 to enable the capacitor 40' to be removed in the manner discussed above with reference to FIG. 2. Then, if it is desired to replace capacitor 41' as well, the second terminal member 52 may be moved vertically upward due to the inherent resilience in conductors 57 and 57' attached to resistance member 56, so that capacitor 41' may be removed from the mounting means.

In order to more clearly illustrate the present invention, an exploded view of the component parts of a portion of the supporting means described above with reference to FIG. 2 is illustrated in FIG. 4 of the drawing. It will be appreciated that similar identical component parts may be used to form the upper portion of the embodiment of the invention discussed above with reference to FIG. 3, except for the second terminal member 52 described therein. Accordingly, the respective component parts of the assembly shown in FIG. 4 are identified by reference numerals the same as those used to identify like parts in FIGS. 2 and 3, with the second terminal member in FIG. 4 being identified with two numbers that are related to the equivalent identifying numbers shown in FIGS. 2 and 3.

Thus, the exploded arrangement shown in FIG. 4 comprises a metal stake member 50, a first terminal member 42 in the form of an electrically conductive metal cylinder including means defining a spring-receiving recess 42a therein. A coil spring 46, a contact member 48 including a terminal-receiving recess 48a therein, and having means defining a contact portion 48c on the end thereof opposite said recess. A capacitor 40 (40'), which may be identical in configuration to each of the capacitors 40-40''' shown schematically in FIG. 1, is positioned in axial alignment with a second terminal member 44 (52); and, finally, a second metal stake member 50' is positioned beneath the second terminal member 44 (52). Since the assembled arrangement of the component parts illustrated in FIG. 4 has been described above, and their operative relationship has been discussed in detail, it is not necessary to an understanding of the invention to repeat such descriptions.

From the foregoing description of the various embodiments of the invention described herein, it will be apparent to those skilled in the art that various modifications and alternative embodiments of the invention may be formed without departing from the true spirit and scope of the invention which is set forth with particularity in the claims appended hereto.

What I claim as new and desire to secure by Letters Patent of the United States is:

1. A surge voltage arrester having a plurality of sparkgap assemblies electrically connected in series to form a discharge path through the arrester, in combination with a plurality of capacitor elements and mounting means for holding and electrically connecting each of said capacitor elements in series with one another and shunt connecting each of the capacitor elements across one of said sparkgap assemblies, respectively, thereby to afford a capacitive voltage grading circuit that is operable to distribute voltage across said sparkgap assemblies; the improvement wherein said mounting means comprises a plurality of electrically conductive metal plate members, each of said plate members being mounted respectively adjacent an end of one of said sparkgap assemblies and in electrically conductive relationship with a main electrode in said one of said sparkgap assemblies, a plurality of elongated first terminal members, each of said first terminal members being formed of electrically conductive metal and shaped to have at least one outer wall surface that is generally parallel to the longitudinal axis of the terminal member, a plurality of elongated second terminal members formed of electrically conductive metal, means defining a spring-receiving recess in one end of each of said first terminal members, a plurality of electrically conductive coil springs mounted respectively in each of said recesses, a plurality of elongated contact members each having means defining a terminal-receiving recess in one end thereof, each of said terminal-receiving recesses being formed to receive one end of one of said coil springs and to have at least one wall surface that is generally parallel to the longitudinal axis of said terminal member, terminal member mounting means for mounting each of said first and second terminal members in fixed relationship, respectively, on separate plate members, each of said first and second terminal members being mounted with their longitudinal axes in substantial alignment, each of said contact members being positioned between a pair of said first and second terminal members with its longitudinal axis held in substantial alignment with the axes of said terminal members by having said at least one wall surface of the contact member positioned in sliding engagement with said at least one outer wall surface of the first terminal member in juxtaposition therewith, and wherein each of said capacitor elements comprises a capacitor having a pair of recessed electrodes on opposite sides thereof, each of said capacitors being positioned respectively between one of said contact members and one of said second terminal members, each of said coil springs being operable to bias one of said contact members into engagement with one of the electrodes on one of said capacitors and to bias the other electrode on said one of said capacitors into engagement with one of said second terminal members, thereby to form an electrical circuit between the two end-most first and second terminal members and all of the series-connected capacitors mounted between them.

2. An invention as defined in claim 1 wherein said outer wall surface on each of said first terminal members is in the form of a cylinder, and the terminal-receiving recess in each of said contact members is in the form of a cylinder having a diameter large enough to slidably receive one end of one of said first terminal members therein.

3. An invention as defined in claim 2 wherein each of said second terminal members includes a cylindrically shaped terminal portion at the outer end thereof, and wherein each of the outermost ends of said terminal portions is substantially smaller in diameter than the diameter of the remainder of the second terminal members, thereby to define a recessed ridge adjacent the outer ends of said terminal members to afford corona free contact between the terminal portions of said terminal members and the electrodes of the capacitors in engagement therewith.

4. An invention as defined in claim 2 wherein each of said capacitors includes means defining a pair of substantially equal sized cylindrically shaped recesses respectively positioned in said opposite sides thereof, one of said recessed electrodes being disposed at the bottom of each of said cylindrically shaped recesses.

5. An invention as defined in claim 4 wherein each of said second terminal members includes means defining a cylindrically shaped contact portion on one end thereof that is adapted to fit into one of the recesses of one of said capacitors in sliding engagement therewith, and wherein each of said contact members includes means defining a cylindrically shaped contact portion on the end thereof opposite the terminal-receiving recess therein, said contact portion on said contact member being adapted to fit into one of the cylindrically shaped recesses of one of said capacitors.

6. A surge voltage arrester having a plurality of sparkgap assemblies electrically connected in series to form a discharge path through the arrester, in combination with a plurality of capacitor elements and mounting means for holding and electrically connecting each of said capacitor elements in series with one another and shunt connecting each of the capacitor elements across one of said sparkgap assemblies, respectively, thereby to afford a capacitive voltage grading circuit that is operable to distribute voltage across said sparkgap assemblies; the improvement wherein said mounting means comprises first, second and third electrically conductive metal plate members, said second plate member being mounted between a pair of said sparkgap assemblies, said first and third plate members being mounted respectively adjacent the ends of said pair of sparkgap assemblies opposed to the respective ends thereof abutting the second plate member, each of said plate members being electrically connected to separate electrodes mounted in the ends of said sparkgap assemblies closest to the plate members, thereby to form an electrical circuit between each of the plate members and said discharge path, elongated first, second and third terminal members each formed of electrically conductive metal and being generally cylindrical in shape, means defining a spring-receiving recess in one end of said first terminal member, an electrically conductive coil spring mounted in said spring-receiving recess, an elongated generally cylindrically shaped contact member having means defining a terminal-receiving recess in one end thereof, said terminal-receiving recess being formed to receive one end of said coil spring and to also receive one end of the first terminal member in sliding engagement therein, terminal member mounting means for mounting said first and third terminal members in fixed relationship, respectively, on said first and third plate members, said first and third terminal members being mounted with their longitudinal axes in substantial alignment, terminal member supporting means formed of dielectric material and mounted on the second plate member for supporting said second terminal member in a predetermined position with respect to said second plate member, said contact member being positioned between said first and third terminal members with its longitudinal axis held in substantial alignment with the axes of said terminal members by said sliding engagement between it and the first terminal member, said second terminal member being supported with its longitudinal axis in alignment with the axes of the other terminal members by said terminal member supporting means, and wherein said plurality of capacitor elements comprises a first and a second capacitor mounted respectively between the first and second terminal member and between the second and third terminal member, each of said capacitors including a pair of electrodes that are biased respectively by said spring into electrical engagement with the terminal members between which the capacitors are mounted.

7. An invention as defined in claim 6 wherein said terminal member supporting means comprises a plate of dielectric material having means defining a generally circular aperture through it, said aperture having a diameter large enough to slidably receive said second terminal member therethrough.

8. An invention as defined in claim 7 including an electrical resistance member having a pair of electric conductors mounted on opposite ends thereof, said conductors being electrically connected, respectively, to said second plate member and said second terminal member.

References Cited

UNITED STATES PATENTS

| | | | |
|---|---|---|---|
| 3,518,453 | 6/1970 | Eason | 317—66 |
| 3,543,097 | 11/1970 | Smith | 317—70 X |
| 2,958,020 | 10/1960 | Eannarino | 339—255 |

J D MILLER, Primary Examiner

H. FENDELMAN, Assistant Examiner

U.S. Cl. X.R.

317—70; 337—34; 339—255